United States Patent [19]

Henry, Sr.

[11] 4,219,992
[45] Sep. 2, 1980

[54] ROW CROP ATTACHMENT FOR COMBINES

[75] Inventor: Albert R. Henry, Sr., Salina, Kans.

[73] Assignee: Darf Corporation, Edenton, N.C.

[21] Appl. No.: 932,207

[22] Filed: Aug. 9, 1978

[51] Int. Cl.$^2$ ............................................. A01D 45/02
[52] U.S. Cl. ..................................................... 56/119
[58] Field of Search ........................... 56/14.4, 51–119, 56/28

[56] References Cited

U.S. PATENT DOCUMENTS

| 457,760 | 8/1891 | Cordrey | 56/100 |
|---|---|---|---|
| 2,817,941 | 12/1957 | Clapsaddle, Jr. | 56/119 |
| 2,999,349 | 9/1961 | Nichols, Jr. | 56/28 |
| 3,812,661 | 5/1974 | Baker | 56/14.4 |
| 3,813,858 | 6/1974 | McDermott | 56/119 |

*Primary Examiner*—Russell R. Kinsey
*Attorney, Agent, or Firm*—Schmidt, Johnson, Hovey & Williams

[57] ABSTRACT

A row crop attachment adapting a combine for efficient harvesting of soybeans and similar crops, has crop-receiving structure disposed forwardly of the cutter for catching beans prematurely separated from the stalks by action of the combine cutter. Multiple, spaced, crop-receiving divider pans for support on the combine in generally underlying relation to the beans define a number of stalk-receiving throats extending fore-and-aft of the combine ahead of the cutter; respective opposed pairs of crop-catching wings are pivotally mounted on the pans for swinging movement in a generally horizontal plane to and from positions closing the throats. In preferred forms, each pair of wings is yieldably biased toward its throat-closing position to maintain the width of the throats at the minimum dimension required to allow passage of stalks to the cutter, whereby the crop-receiving structure presents a substantially continuous expanse for catching prematurely separated beans.

26 Claims, 7 Drawing Figures

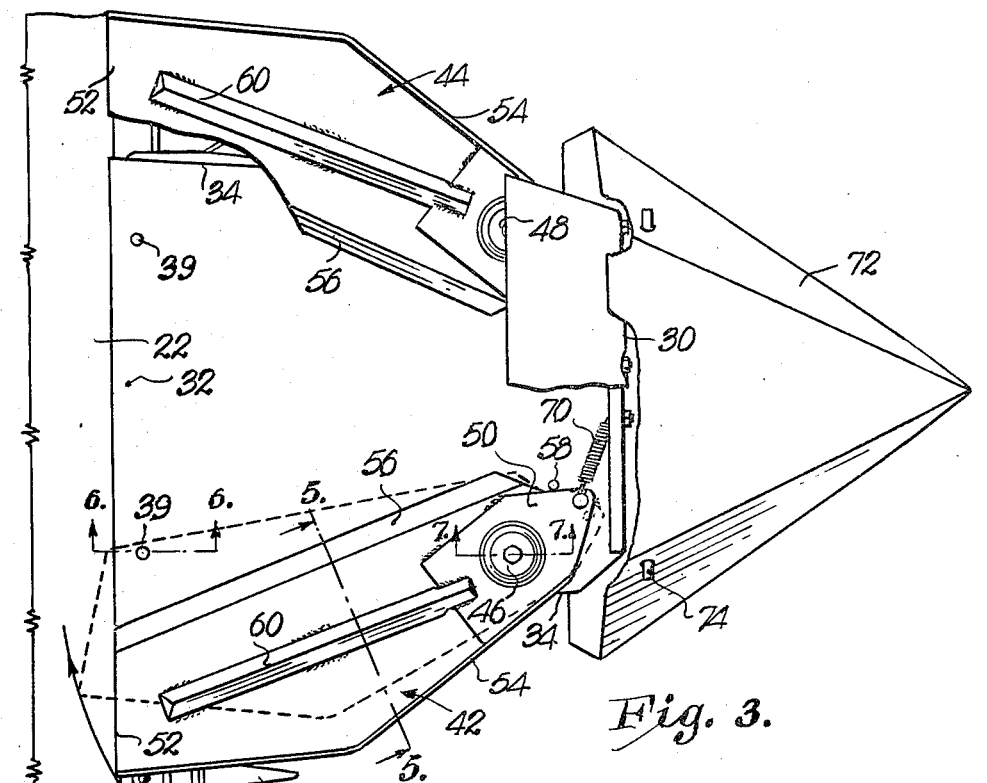

ROW CROP ATTACHMENT FOR COMBINES

TECHNICAL FIELD

This invention relates to headers for forage harvesters in general, and particular concerns a yield-improving row crop attachment for combines.

BACKGROUND ART

In the harvesting of crops with combines and similar agricultural machinery, a certain percentage of the crop is left in the field by the machine thereby contributing to reduced overall crop yield. This unrecovered percentage varies depending upon the type of crop harvested; for example, very little loss occurs in the harvesting of wheat, whereas substantial crop losses may occur with the machine harvesting of soybeans.

Indeed, in the harvesting of soybeans and similar crops, the material loss percentage is excessively high, and under certain weather conditions may result in prohibitive financial loss to the farmer. In this regard, since soybeans are normally harvested after the foilage drops from the stalk and the plant is thoroughly dry, the beans are relatively easily separated from the stalk making them particularly susceptible to field loss due to mechanical action of the harvester. It has been found that the reciprocable sickle of the combine creates a shattering action in the bean stalks which in turn effects premature separation of the beans from the supporting stalks and resultant loss of beans which do not overlie bean-receiving pans at the time of separation.

Numerous efforts have been made to improve the efficiency of bean harvesters. One approach has been to provide a low lying, floating cutter bar such that the bean stalks may be severed close to the ground thereby reducing the degree of shattering induced by the reciprocating sickle.

Another approach attempting to solve the problem described above is shown in U.S. Pat. No. 3,812,661 issued to Baker, and entitled "Harvesting Machine With Crop Saving Attachment". This patent shows the use of crop-catching pans pivotally supported forwardly of the combine sickle for salvaging beans which are shattered from the stalk by the cutting action. However, the device has certain shortcomings, particularly with respect to bean loss in the area between the catchers.

DISCLOSURE OF INVENTION

The present invention overcomes the field loss problem with row-planted bean crops and the like by the provision of crop-catching structure arranged and disposed to present a substantially continuous horizontal expanse forwardly of the sickle for salvaging beans which are prematurely separated from the stalk by action of the harvester. The structure includes multiple crop-receiving pans adapted to be mounted in parallel, laterally spaced relation along the combine cutter bar for defining a plurality of fore-and-aft extending, stalk-receiving throats serving to guide the stalks to the sickle.

Each of the fore-and-aft extending throats is variably constricted by a pair of opposed, yieldably biased wings shiftable to and from a position closing the throat. As the harvester advances along rows of crops, the respective pairs of wings are parted sufficiently to permit passage of the stalks through the throats, yet the spread between the wings in each pair is held to a minimum dimension by virtue of the wing pans being biased toward their throat-closing positions. Hence, the area immediately forward of the sickle has a virtually continuous bean-catching structure supported beneath the beans for salvaging any of the latter which may be prematurely separated from the stalks.

A forwardly extending snout may be mounted on each pan for lifting fallen stalks and for guiding the stalks into the throats leading to the sickle. Additionally, each pan may be provided with a skid adapted to be disposed below the combine cutter bar for protecting the latter against ground engagement and for diverting groundlying trash away from the sickle.

BRIEF DESCRIPTION OF DRAWING

In the drawing:

FIG. 3 is an enlarged, fragmentary, top plan view of the divider unit with portions thereof broken away to reveal details of construction;

FIG. 4 is an enlarged, fragmentary, side elevational view of the unit with portions thereof broken away and shown in section to reveal details of construction;

FIG. 5 is an enlarged, fragmentary, cross-sectional view taken along line 5—5 of FIG. 3;

BEST MODE FOR CARRYING OUT THE INVENTION

Figure 1:
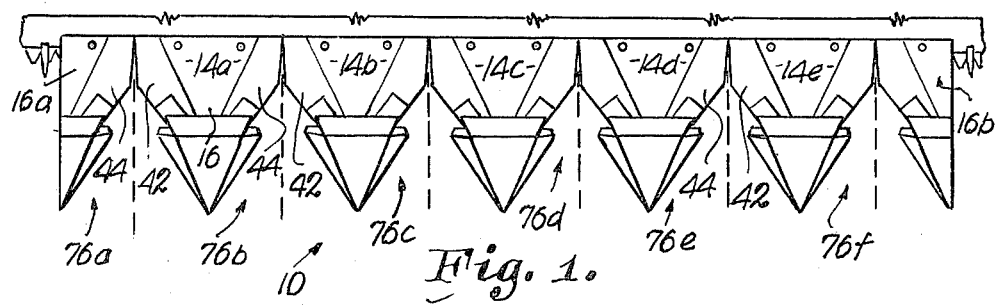
FIG. 1 is a fragmentary top plan view of a row crop attachment assembly constructed in accordance with the principles of the present invention and shown mounted on a conventional cutter bar.

In FIG. 1 there is shown a row attachment assembly 10 mounted on a cutter bar 12 which in turn extends transversely across the front of a forage harvester (not shown). The attachment assembly 10 comprises a plurality of forwardly projecting divider units 14 positioned at predetermined spaced locations along the length of the cutter bar 12 corresponding to the spacing between the rows of crops to be harvested (represented by broken lines in FIG. 1). Opposite ends of the assembly 10 are provided with half divider units 16 as will be described in further detail hereinbelow.

Figure 2:
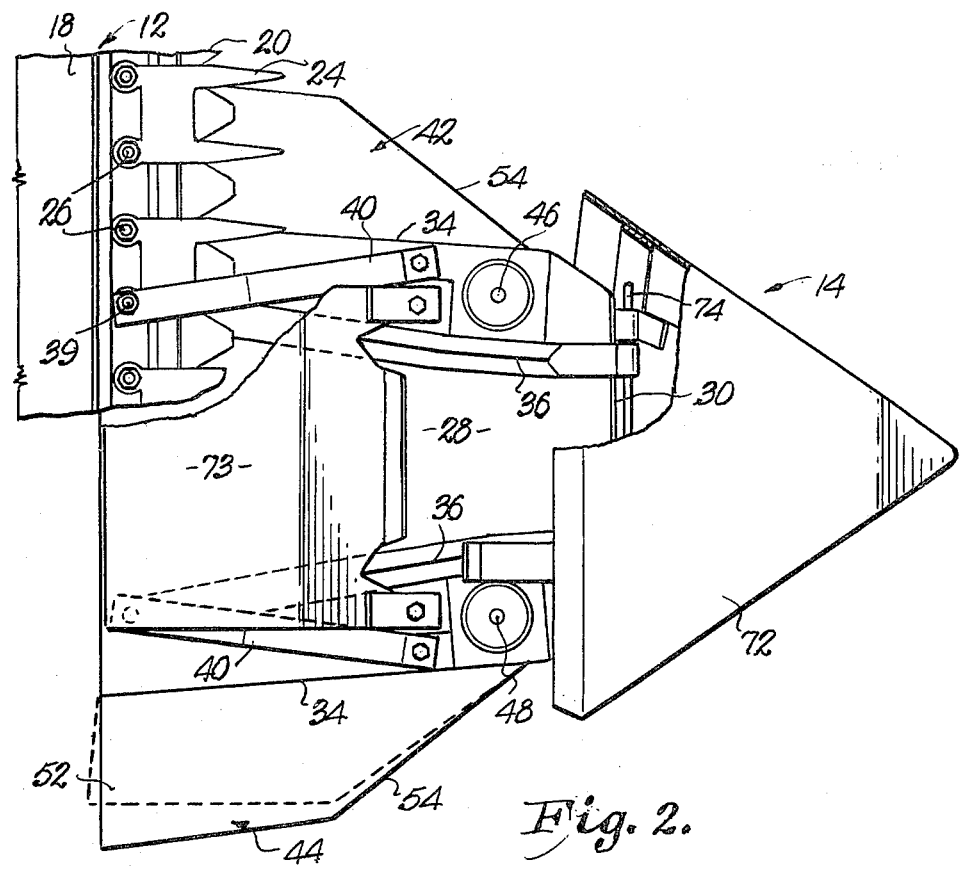
FIG. 2 is an enlarged, fragmentary, bottom plan view of a typical divider unit in the assembly with portions thereof broken away to reveal details of construction.

As shown in FIGS. 2–4, the cutter bar assembly 12 includes an elongate support beam 18 extending transversely of the harvester, a sickle assembly 20 supported on the forward edge of the beam 18 and a main pan 22 mounted over the beam 18 behind the sickle assembly 20 for supporting crops severed by the latter prior to their being urged rearwardly by the reel of the harvester. The sickle assembly may be provided with guards 24 of a conventional design for protecting against damage from contact with rocks or groundlying trash. The sickle assembly 20 and guards 24 are releasably attached to the beam 18 by bolts 26 which mate with prelocated apertures spaced along the length of the beam 18. As shown for example in FIG. 4, the sickle assembly is normally carried at an upward incline fore-to-aft when properly mounted on the beam 18.

Figure 6:
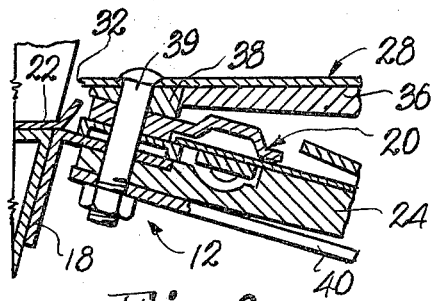
FIG. 6 is an enlarged, fragmentary, cross-sectional view taken along line 6—6 of FIG. 3.

Each divider unit 16 is provided with a crop-receiving pan 28 having a forwardly facing front edge 30, an apertured rear edge 32 adapted to be mounted on the beam 18, and a pair of opposed side edges 34 extending fore-and-aft between the front and rear edges 30, 32. The pan 28 is provided with underlying ribs 36 each terminating at a rearmost incline mounting block 38 (shown only in FIG. 6) cooperable with elongate mounting bolts 39 to support the pan 28 on the beam 18 in a normally horizontally disposed position as opposed to the inclined orientation of the assembly 20. A pair of lower supports 40 on the underside of the pan 28 are also adapted to be secured by the bolts 39 to augment the securement between the beam 18 and the divider unit 14.

A pair of elongate, crop-catching wings 42, 44 are mounted on the pan 28 for swinging movement about spaced upright axes by pivot mountings 46, 48 respectively. The mountings 46, 48 are spaced forwardly of the sickle assembly 20 and each is disposed adjacent a respective side edge 34 such that the wings 42, 44 are swingable in a generally horizontal plane outwardly beyond the respective edges 34.

As shown for example in FIG. 3, the wings 42, 44 are virtual mirror images of one another, each having a forward end 50 associated with the respective mountings 46, 48; a rear end 52 normally overlying the sickle assembly 20, an outermost, upturned lateral edge 54 extending between the ends 50, 52; and an opposed inner downturned lateral edge 56. As illustrated in the drawings, the lateral edges 54 of each wing 42, 44 angle inwardly as ends 50 are approached to present a slight forward taper for a purpose to be described. A stop 58 (and only one of which is shown in FIG. 3) is provided for each of the wings 42, 44 to define limits of swinging movement as illustrated in FIG. 3. Additional rigidity for the wings 42, 44 may be provided by stiffening ribs 60 or similar structure.

Figure 7:
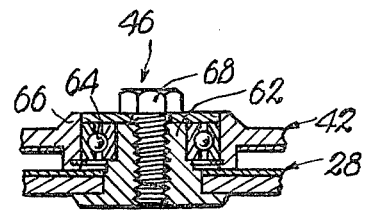
FIG. 7 is an enlarged, fragmentary, cross-sectional view taken along line 7—7 of FIG. 3.

Considering now FIG. 7, there are shown the details of construction for the pivot mounting 46, it being understood that mounting 48 is identically configured. An upwardly projecting cylindrical nub 62 on the pan 28 is received within a ball bearing 64 carried in a tubular boss 66 on the wing 42. The nub 62 has a central threaded aperture which mates with a retaining bolt and washer assembly 68 such that the wing 42 may be removed from the pan 28 as desired.

Each of the wings 42, 44 is provided with a coil spring 70 extending between end 50 and the front edge 30 of pan 28 as shown in FIG. 3. The arrangement of the springs 70 is such that each of the wings 42, 44 is biased outwardly in a direction extending beyond the respective side edges 34.

The units 14 are each provided with a forwardly tapered snout 72 mounted on the front edge 30 of the pan 28 by a pin hinge 74 to permit up and down swinging movement between the extreme positions shown in FIG. 4. The snout 72 serves to lift fallen stalks as well as to gently guide the stalks to the area between adjacent divider units 14. Additionally, the units 14 have ground engaging skids 73 for protection against damage to the underside of the attachment assembly 10 from rocks and ground trash.

Considering again FIG. 1, the crop-receiving pans 28 are preferably mounted in spaced relation along the length of cutter bar 12 to define a plurality of fore-and-aft extending, stalk-receiving throats 76 therebetween. It is noted that the throats 76 are variably constricted by wings 42, 44 of adjacent divider units 14. For example, the wing 44 of divider unit 14a cooperates with wing 42 of divider unit 14b to yieldably constrict the stalk-receiving throat 76b while the wing 44 of divider unit 14b cooperates with the wing 42 of divider unit 40c to constrict the throat 76c. Hence, the throats 76 are normally closed but may be opened sufficiently to allow passage of crop stalks rearwardly to the sickle assembly 20 by yielding swinging movement of the wings 42, 44 against the biasing of springs 70.

The half divider units 16a, 16b as shown in FIG. 1 are mirror images of one another, each representing one half of a divider unit 14 cut along its longitudinal axis of symmetry. Hence, the half divider unit 16a has a swingable, yieldably biased pan 44 which cooperates with the pan 42 of divider unit 14a to constrict the throat 76a. Similarly, the half divider unit 16b has a swingable wing 42 cooperable with the wing 44 of divider unit 14e to yieldably constrict the throat 76f.

INDUSTRIAL APPLICABILITY

As explained hereinabove, the row attachment assembly 10 is particularly adapted for use in harvesting row planted soybeans and similar crops wherein unacceptably high field loss due to machine-induced shattering has been experienced heretofore. In use, the pans 28 and wings 42, 44 of the divider units 14, 16 collectively present a substantially continuous crop-catching structure for salvaging beans which are prematurely separated from the stalk forwardly of the sickle assembly 20.

The attachment assembly 10 shown in FIG. 1 presents six stalk-receiving throats 76 and hence, it is adapted for harvesting six rows of soybeans in a single pass. Normally the cutter bar 12 is positioned at an elevation proximal to the ground such that the skids 73 are in contact with or spaced slightly above the ground. The harvester is maneuvered by the operator such that the rows of soybeans are received within the respective throats 76 as the harvester advances through the field.

Forward movement of the harvester causes the stalks to move rearwardly relative to the attachment assembly 10 such that the stalks pass through the throats 76 to the sickle assembly 20 for severing. The resistance presented by the stalks is adequate to part the cooperating wings 42, 44 a distance sufficient to allow passage of the stalks through the throats 76. In this connection, the tapers presented at ends 50 of the wings 42, 44 by the upturned outer edges 54 serve to facilitate spreading of the wings 42, 44 by the stalks as they pass rearwardly toward the sickle assembly 20. At the same time however, the biasing forces imparted by the springs 70 on the wings 42, 44 are sufficient to hold them tightly against the stalks in the throats 76 such that the crop-catching structure presented by the divider units 16 remains substantially continuous.

As the stalks are engaged by the sickle assembly 20, a certain amount of shattering will be imparted thereto causing separation of beans from the stalks forwardly as well as rearwardly of the assembly 20. Falling beans behind the assembly 20 will be collected on the main pan 22 and fed rearwardly by the harvester reel; beans which separate from the stalk forwardly of the sickle assembly are also salvaged by the collective structure of the pans 28 and wings 42, 44. In this connection, it is an important feature of the present invention that the underlying, crop-catching structure presented by the divider units 14, 16 is substantially continuous at all times during the harvesting process, the only discontinuities being the small variable dimension gaps between the cooperating wings 42, 44 of adjacent divider units 16 which allow rearward passage of the stalks to the assembly 20.

Should a field of fallen stalks be encountered, such as might be found in a rain damaged area, the snouts 72 serve to lift the stalks from the ground and guide them into the respective throats 76 as the harvester is advanced through the field. Under such conditions, the advantages of the present invention become even more apparent because more of the beans will be caused to be prematurely separated from the stalks and consequently, a larger percentage of beans which would otherwise be lost in harvesting are collected by the divider units 14, 16.

It is noted further that the upturned outer edges 54 also function to loss of collected beans from the sides of the wings 42, 44. The downturned inner edges 56 on the other hand, serve to preclude entrapment of beans between the pan 28 and the wings 42, 44 as the latter swing thereacross.

If the farmer desires to use his harvester for other crops or drill planted beans, it is but a simple matter to remove the divider units 14, 16 by releasing the bolts 36 which attach pans 28 to the beam 18.

From the foregoing, it will be appreciated that the present invention offers a relatively inexpensive, highly effective solution to the problem of field loss during harvesting of soybeans and crops of similar variety. All of the advantages of the present invention are accomplished without the need for modification to the harvester in any manner such that the farmer is provided with a highly versatile tool for increasing the utility of his capital equipment.

What I claim is:

1. A row attachment assembly for a harvester of the type having a forwardly disposed cutter bar extending transversely at the harvester and cutter means supported on the bar for severing standing crops at the stalk beneath the fruit, said attachment including:
    a pair of crop-receiving divider pans adapted to be mounted on said cutter bar and project forwardly therefrom in laterally spaced relation to one another for defining a stalk-receiving throat therebetween extending generally fore-and-aft of the harvester; and
    means for variably constricting said throat to the minimum width dimension required to permit passage of said stalks through the throat,
    said constricting means including a pair of opposed crop-catching wings each pivotally mounted on a respective one of said pans for cooperable shifting movement opening and closing said throat, and
    means yieldably biasing said wings toward a position closing the throat whereby the wings are tightly held against said stalk as the latter pass through the throat such that fruit dislodged from the stalks by the harvester is caught by the underlying wings.

2. The invention of claim 1, the axis of swinging movement for each of said wings being substantially upright.

3. The invention of claim 2, said axes being disposed forwardly of said cutter means.

4. The invention of claim 1, the rearmost portion of each of said pans overlapping said cutter means when said structures are mounted on said cutter bar.

5. The invention of claim 1; and a pair of forwardly extending snouts each carried on a respective one of said pan.

6. The invention of claim 5, there being hinge means pivotally attaching each snout to its respective pan for up and down movement about a transversely extending axis.

7. The invention of claim 1; and a skid member for each pan, each skid member being disposed below said cutter means in proximal relation to the ground when said pans are mounted on said cutter bar.

8. The invention of claim 1; each of said wings overlying its supporting pan and having an elongate edge margin remote from said throat, said margins being downturned to preclude entrapment of fruit between the wings and their supporting pans.

9. In a crop harvester having a cutter bar and cutter means supported thereupon for severing rows of standing crops at the stalks beneath the fruit, an improved row attachment assembly including:
    a pair of divider structures mounted on said cutter bar and projecting forwardly therefrom in laterally spaced relation to one another for defining a stalk-receiving throat therebetween extending generally fore-and-aft of the harvester;
    means for variably constricting said throat to the minimum width dimension required to permit passage of said stalks through the throat,
    said constricting means including a pair of opposed crop-catching wings each pivotally mounted on a respective one of said pans for cooperable shifting movement opening and closing said throat;
    means yieldably biasing said wings toward a position closing the throat whereby the wings are tightly held against said stalks as the latter pass through the throat such that fruit dislodged from the stalks by the harvester is caught by the underlying wings.

10. The invention of claim 9, the axis of swinging movement for each of said wings being substantially upright.

11. The invention of claim 10, said axes being disposed forwardly of said cutter means.

12. The invention of claim 9, the rearmost portion of each of said pans overlapping said cutter means.

13. The invention of claim 9; and a pair of forwardly extending snouts each carried on a respective one of said pans.

14. The invention of claim 13, there being hinge means pivotally attaching each snout to its respective pan for up and down movement about a horizontal axis.

15. The invention of claim 9; and a skid member for each pan, each skid member being disposed below said cutter means in normal proximal relation to the ground.

16. The invention of claim 9; each of said wings having an elongate edge margin remote from said throat, said margins being downturned to preclude entrapment of fruit between the wings and their supporting pans.

17. A row crop attachment for the cutter bar of a combine, said attachment including:
    a crop-receiving divider pan having front and rear ends and a pair of opposed, fore-and-aft side edges;
    means adjacent rear end for attaching the pan to the cutter bar with the pan extending forwardly from the cutter bar and normally disposed in a generally horizontal plane,
    a pair of spaced, crop-receiving wings overlying the pan,
    each wing having an essentially upright pivot mounting the same on the pan for swinging movement of the wings toward and away from each other; and means yieldably biasing the wings away from each other to a position where each extends laterally beyond the proximal of said edges of the pan.

18. The invention of claim 17; a divider snout; and hinge means coupling the snout with the pan at said front end for up and down swinging movement.

19. A row crop assembly for attachment to the cutter bar of a combine, said assembly comprising of a row of side-by-side row divider units having stalk-receiving throats therebetween, each unit including:
a crop-receiving divider pan having front and rear ends and a pair of opposed, fore-and-aft side edges;
means adjacent said rear and for attaching the pan to the cutter bar with the pan extending forwardly from the cutter bar and normally disposed in a generally horizontal plane;
a pair of spaced, crop-receiving wings overlying the pan,
each wing having an essentially upright pivot mounting the same on the pan for swinging movement of the wings toward and away from each other; and
means yieldably biasing the wings away from each other to a position where each wing of each pan is substantially contiguous to the proximal wing of the next adjacent pan whereby to close said throats.

20. In a harvester:
Means for cutting the stalks of a standing crop;
A pair of wings having fruit retention means for catching the fruit of said crop shattered therefrom;
Support means for said wings;
Means mounting said wings on the support means for movement of the wings toward and away from each other; and
Means normally holding said wings yieldably biased toward each other in a normal position of relative adjacency,
There being a crop inlet throat between the wings when the same are in said position for reception of said standing crop and for spreading of the wings apart by said stalks against the action of said holding means when the crop engages the wings.

21. The invention of claim 20; and means disposed laterally of the wings for catching and retaining fruit not caught and retained by the wings, said wings being movable relative to said last mentioned means.

22. In a harvester:
means for cutting the stalks of a standing crop;
means mounting said cutting means proximal to the forward end of said harvester;
a pair of fruit catchers having fruit retention means for catching the fruit of said crop falling therefrom;
means mounting said fruit catchers proximal to and ahead of said cutting means and on opposite sides of a row of fruit-producing stalks for movement of the fruit catchers toward and away from each other to accommodate the stalks between the fruit catchers, and for yieldably biasing said catchers toward each other and the standing crop therebetween to a normal position of relative adjacency;
there being a crop inlet throat between the adjacent fruit catchers when the same are in said position for reception of said standing crop and for spreading of the fruit catchers apart by said stalks against the closing action of said fruit catchers so that the crop maintains engagement with the fruit catchers on both sides thereof forming a closure to prevent the fruit of said crop from falling to the ground when said stalks are cut; and
means operatively associated with said fruit catchers to direct said fruit to a container therefor.

23. The invention of claim 21; and second catching means disposed laterally of the first fruit catchers for catching and retaining fruit not caught and retained by the first catchers, said first catchers being movable relative to said last mentioned catching means.

24. In a harvester:
means for cutting the stalks of a standing crop;
means mounting said cutting means proximal to the forward end of said harvester;
a pair of juxtaposed fruit supporting catchers having fruit retention means;
means supporting said catchers ahead of and proximal to said cutting means, and in a position to define therebetween a stalk-receiving inlet throat, for receiving fruit from said stalks; and
means operably coupled with said catchers for normally maintaining said throat closed;
said last-mentioned means being yieldable for allowing said stalks to pass through the throat.

25. The invention of claim 23; and means disposed laterally of the catchers for receiving and retaining fruit not caught and retained by the catchers.

26. In a harvester:
means for cutting the stalks of a standing crop;
means mounting said cutting means proximal to the forward end of said harvester;
means for catching the fruit of said crop, including a pair of fruit catchers having a stalk-receiving crop inlet throat therebetween, and for normally and yieldably maintaining said throat closed for engaging said stalks and allowing the same to pass through the throat, and
means supporting said catchers proximal to and ahead of said cutting means, and relative to said stalks entering said throat in position for receiving the fruit of said crop falling therefrom,
said catchers having fruit retention means.

* * * * *